United States Patent
Shah et al.

(10) Patent No.: US 10,927,911 B2
(45) Date of Patent: Feb. 23, 2021

(54) ADJUSTER MECHANISM

(71) Applicant: Meritor Heavy Vehicle Braking Systems (UK) Limited, Gwent (GB)

(72) Inventors: Neel Shah, Gwent (GB); Dave Hubbard, Gwent (GB); Sean Cleary, Gwent (GB); Refaat Malki, Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 6 days.

(21) Appl. No.: 16/386,857

(22) Filed: Apr. 17, 2019

(65) Prior Publication Data
US 2019/0331185 A1   Oct. 31, 2019

(30) Foreign Application Priority Data
Apr. 30, 2018 (EP) .................................. 18170194

(51) Int. Cl.
| F16D 65/56 | (2006.01) |
| F16D 55/2255 | (2006.01) |
| F16D 121/14 | (2012.01) |
| F16D 125/64 | (2012.01) |

(52) U.S. Cl.
CPC ....... F16D 65/567 (2013.01); F16D 55/2255 (2013.01); *F16D 2121/14* (2013.01); *F16D 2125/64* (2013.01); *F16D 2250/0007* (2013.01)

(58) Field of Classification Search
CPC ........ F16D 65/18; F16D 65/567; F16D 65/66; F16D 55/2255; F16D 65/56; F16D 2125/40; F16D 2125/64; F16D 2121/14; F16D 2250/0007

USPC .............................. 188/71.1, 71.7–71.9, 72.8
See application file for complete search history.

(56) References Cited

U.S. PATENT DOCUMENTS

| 3,726,367 A | * | 4/1973 | Evans | ...................... F16D 65/18 |
| | | | | 188/106 P |
| 3,757,906 A | | 9/1973 | Baezold | |
| 3,920,103 A | | 11/1975 | Haraikawa | |
| 5,249,646 A | * | 10/1993 | Thiel | ...................... F16D 65/567 |
| | | | | 188/196 D |

(Continued)

FOREIGN PATENT DOCUMENTS

| CN | 1696532 A | 11/2005 |
| CN | 102840257 A | 12/2012 |

(Continued)

OTHER PUBLICATIONS

European Patent Office, Extended European Search Report for corresponding European Application No. 18170194.7—1012, dated Nov. 20, 2018.

(Continued)

*Primary Examiner* — Thomas W Irvin
(74) *Attorney, Agent, or Firm* — Brooks Kushman PC

(57) ABSTRACT

An adjuster mechanism for a disc brake. The adjuster mechanism may include an outer piston and an inner piston. The outer piston may define a bore having a female thread, a non-threaded region, and a transition region. The non-threaded region may have a greater diameter than a minor diameter of the female thread. The minor diameter of the female thread in the transition region may progressively increase until it meets a major diameter of the female thread.

16 Claims, 5 Drawing Sheets

(56) References Cited

U.S. PATENT DOCUMENTS

| | | | |
|---|---|---|---|
| 10,527,118 B2 * | 1/2020 | Kulkarni | F16D 65/183 |
| 2005/0252727 A1 | 11/2005 | England et al. | |
| 2006/0118369 A1 | 6/2006 | Fischer et al. | |
| 2012/0325595 A1 * | 12/2012 | Malki | F16D 65/0068 188/71.7 |
| 2013/0008749 A1 * | 1/2013 | Sandberg | F16D 65/18 188/71.8 |
| 2013/0087417 A1 | 4/2013 | Yu et al. | |
| 2015/0159714 A1 * | 6/2015 | Malki | F16D 65/0068 188/71.7 |
| 2017/0292576 A1 | 10/2017 | Henning et al. | |
| 2019/0024740 A1 * | 1/2019 | Taylor | F16D 65/183 |
| 2019/0024742 A1 * | 1/2019 | Taylor | F16D 65/567 |
| 2019/0063530 A1 * | 2/2019 | Kulkarni | F16D 65/52 |
| 2019/0329754 A1 * | 10/2019 | Raveendrappa | F16D 55/18 |
| 2019/0331184 A1 * | 10/2019 | Taylor | F16D 55/2255 |

FOREIGN PATENT DOCUMENTS

| | | | |
|---|---|---|---|
| CN | 103476357 A | 12/2013 | |
| CN | 206144939 U | 5/2017 | |
| EP | 0103512 A1 | 3/1984 | |
| EP | 0352306 A1 | 1/1990 | |
| WO | 1989006759 A1 | 7/1989 | |

OTHER PUBLICATIONS

India Examination Report dated Aug. 27, 2020, for related India Appln. No. 2019104015594; 6 Pages.
Chinese Office Action dated May 6, 2020, for related Chinese Appln. No. 201910345703.0; 6 Pages.

\* cited by examiner

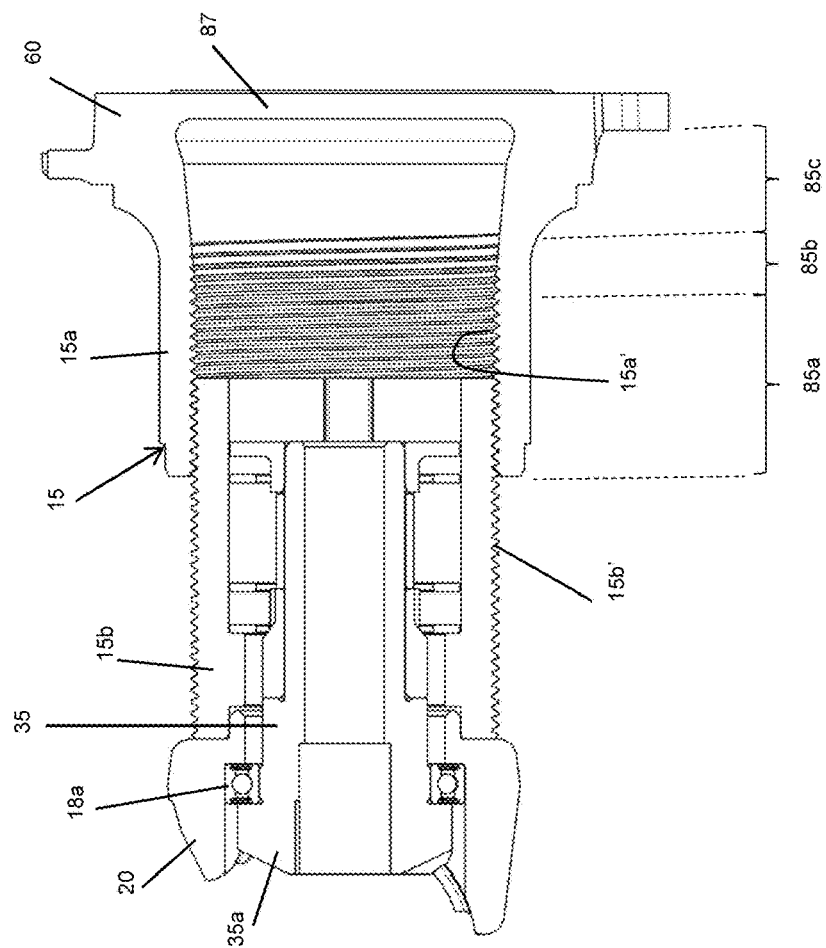
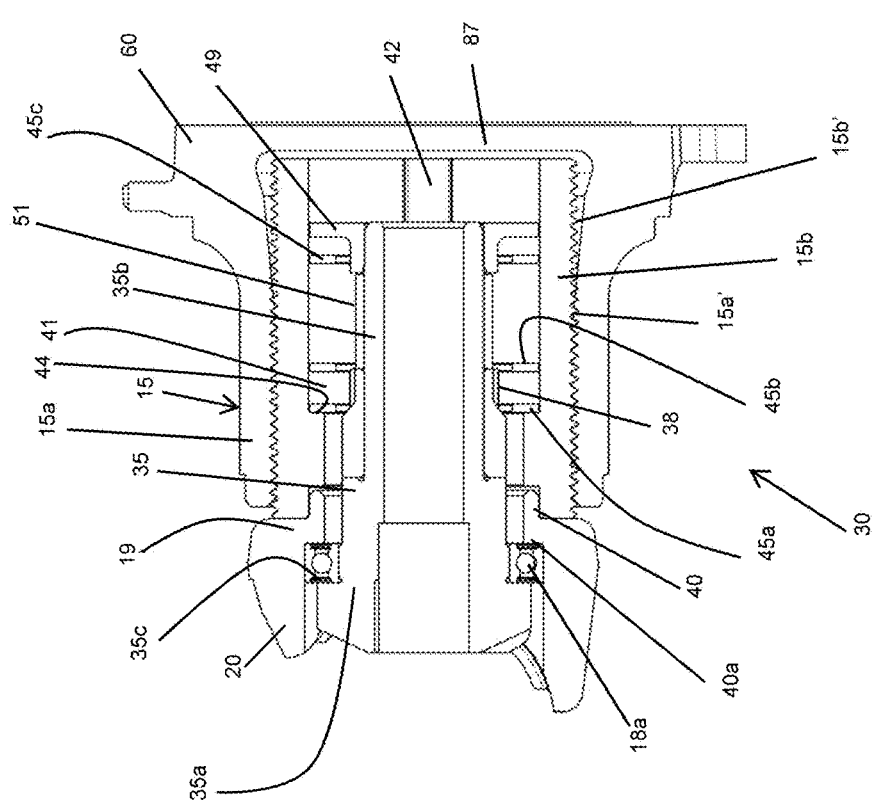

ADJUSTER MECHANISM

TECHNICAL FIELD

The present teachings relate to an adjuster mechanism, in particular but not exclusively an adjuster mechanism for an air actuated disc brake. The present teachings also relate to an air disc brake and to a method of manufacturing an adjuster mechanism.

BACKGROUND

In many air disc brakes, for use on heavy vehicles such as trucks and buses, an operating shaft is used to convert the relatively large movement of an air actuator to a smaller, higher force movement of friction elements (brake pads) of the brake to clamp a brake rotor and frictionally retard its rotation to effect braking of an associated wheel when the brake is actuated.

Typically, these brakes also include adjuster mechanisms to set the position of the friction elements having friction material relative to the brake rotor, to account for wear of the friction material and the rotor in brake use and maintain a desired "running clearance" between the friction material and rotor. The adjuster mechanism often has an input driving portion that is in communication with the operating shaft, so that when the gap between the friction material and the rotor is undesirably large, the operating shaft drives the driving portion, which then transmits a torque to the remainder of the adjuster mechanism, to cause a piston or tappet to extend and move the friction material towards the rotor.

Pistons often include inner and outer pistons that are in threaded engagement, with one being restrained from rotation and the other being rotated when adjustment is needed to cause the piston as a whole to extend or retract.

In order to effect braking of heavy vehicles, significant forces are required to clamp the friction elements to the brake rotor, and therefore significant forces are transmitted through the piston or pistons.

Some air disc brakes utilize a single extendible piston to account for wear. In these brakes the load can be particularly high as it is not shared between two pistons and there is a heightened risk of a piston failing over repeated cycles of high loads. The present applicants have recognized that one location where such a failure may occur is at a stepped transition from a female threaded part of an outer piston to a non-threaded part outboard thereof.

The present invention seeks to overcome or at least mitigate the problems of the prior art.

SUMMARY

A first aspect provides an adjuster mechanism for an air actuated disc brake, the adjuster mechanism comprising an outer piston defining a bore having a female thread, the female thread having a minor diameter and a major diameter; and an inner piston having a complementary male thread thereon; wherein the outer piston further comprises a non-threaded region of greater diameter than the minor diameter and a transition region between the female thread and the non-threaded region; and wherein in the transition region the minor diameter of the female thread progressively increases until it meets the major diameter.

The progressive transition from a full thread region to a thread free region minimizes stepped transitions of the outer piston that may act as stress raisers, which may in turn lead to premature failure of the outer piston under load. In addition, the thread tapping process may be eased by virtue of this arrangement The minor diameter may increase in a linear manner in the transition region.

This may simplify manufacture of the outer piston and further reduce stresses.

The non-threaded region may progressively increase in diameter away from the transition region.

This may further simplify manufacture, in particular for a casting process using cores to create the transition in a non-threaded region.

The progressive increase in the diameter of the non-threaded region may be a continuation of the progressive increase of the minor diameter.

This may still further simplify manufacture.

The non-threaded region may comprise, at least in part, a frusto-conical profile.

The outer piston may further comprise an end wall at an end remote from the female thread portion.

This is a cost-effective way of manufacturing a piston that is sealed from the external elements.

The end wall may be integral and monolithic with the non-threaded region.

A plate may be integrally and monolithically formed at the end remote from the female thread, the plate being arranged to have a greater surface area than that defined by an outer perimeter of the non-threaded region to spread a load applied by the piston across a friction element actuated by the outer piston in use.

This is a beneficial way of manufacturing a piston that minimizes uneven wear of a friction element in use.

The outer piston may be a cast component.

Casting is a convenient way of manufacturing the general shape of an outer piston of this type.

The outer piston may comprise an end wall at an end remote from the threaded portion, The end wall may be integral and monolithic with the non-threaded portion. The non-threaded portion may have a bare cast surface.

A bare cast surface has a surface roughness greater than a smoothly machined surface caused by the impression of the sand used to form the mold in the casting process. However, the roughness would not affect operation of the piston given the shape thereof.

By avoiding the need to machine this surface manufacturing costs may be minimized.

The adjuster mechanism may be configured such that in a fully retracted state of the piston the inner piston extends outboard beyond the transition region.

This arrangement ensures a smoother operation of the piston when extending and retracting.

The adjuster mechanism may further comprise a torque limiting clutch and a one-way clutch arranged to take an input from an operating shaft and selectively transmit the input to the inner piston to cause rotation of the inner piston and extension of the outer piston.

The adjuster mechanism may be part of an air actuated or electromechanically actuated disc brake.

According to a further aspect, there is provided a method of manufacturing an adjuster mechanism for an air disc brake, the method comprising the steps of: casting an outer piston having a bore, the bore having a first region having a first diameter, a transition region adjacent the first region and having a progressively increasing diameter and a third region having a diameter at least as large as the largest diameter of the transition region; and cutting a female thread in the outer piston having a minor diameter greater than the diameter of the first region and a major diameter less than smaller in diameter of the third region such that the first region defines a threaded region, the third region defines non-threaded region and in the transition region the minor diameter of the female thread increases until it meets the major diameter.

Manufacturing an adjuster mechanism in this way may minimize cost since the outer piston is made with a low number of machining operations and the geometry may make those operations easier to carry out.

The minor diameter may increase in a linear manner in the transition region.

This may simplify manufacture of the outer piston and further reduce stresses.

The non-threaded region may progressively increase in diameter away from the transition region.

This may further simplify manufacture, in particular for a casting process using cores to create the transition in a non-threaded region.

BRIEF DESCRIPTION OF THE DRAWINGS

Embodiments of the present teachings will now be described, by way of example only, with reference to the accompanying drawings, in which:

FIG. 4 is a view similar to FIG. 2 but showing just the adjuster mechanism;

FIG. 5 is a view similar to FIG. 3 but showing just the adjuster mechanism; and

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
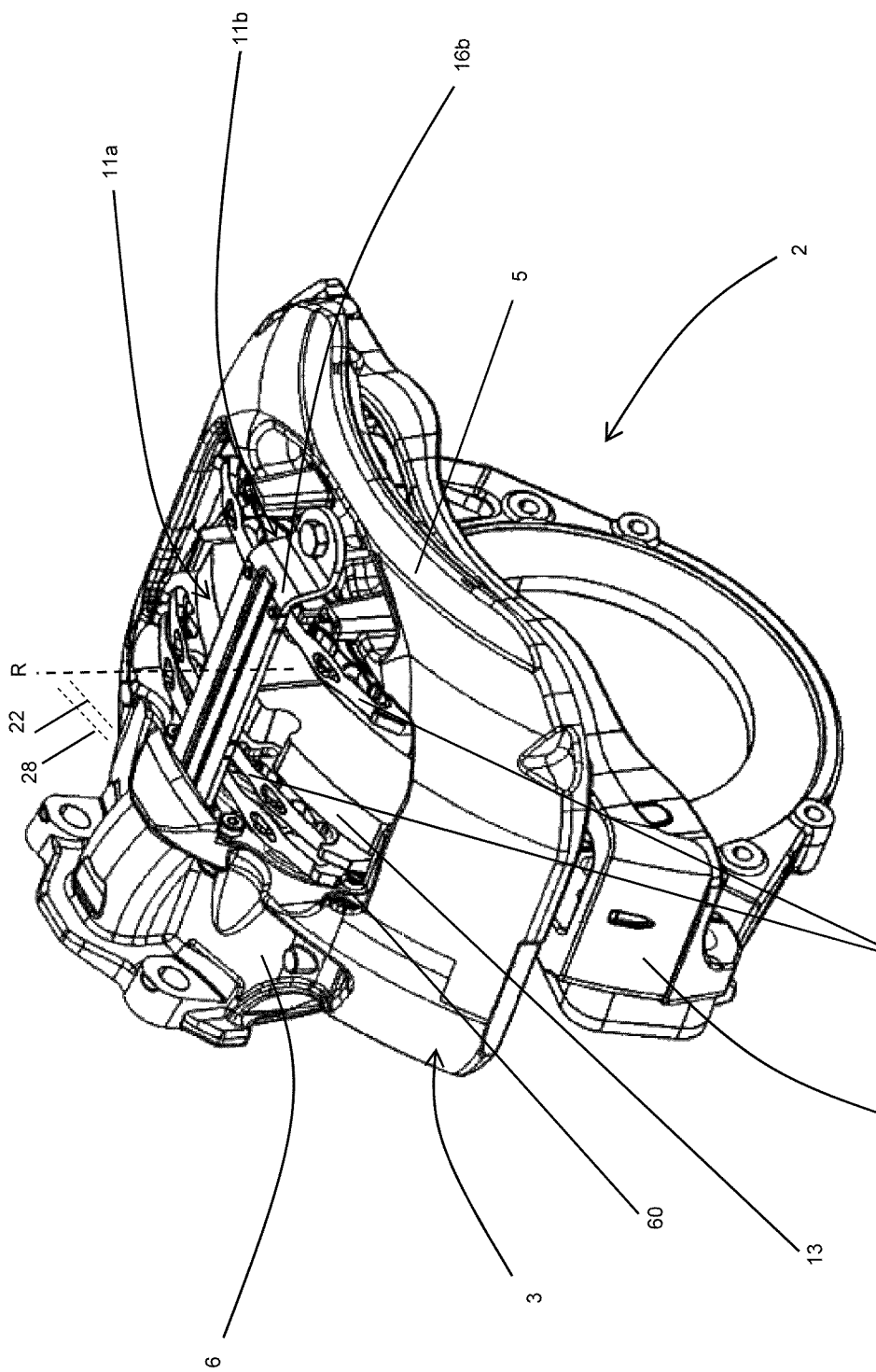
FIG. 1 is an isometric view of a disc brake having an adjustment mechanism according to an embodiment of the present invention.
Figure 2:
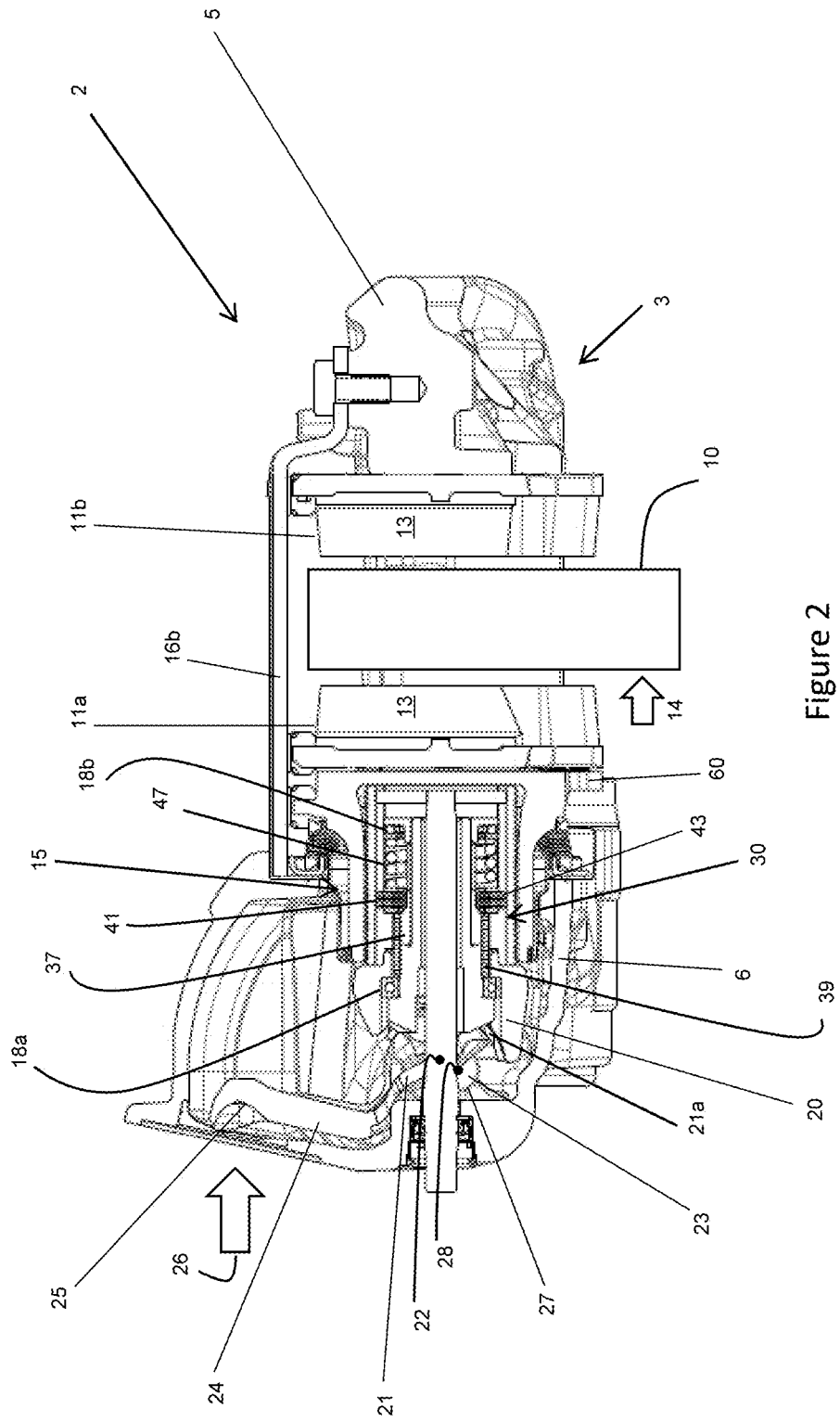
FIG. 2 is a radial cross-section through the brake of FIG. 1 with brake pads in an unworn condition.
Figure 3:
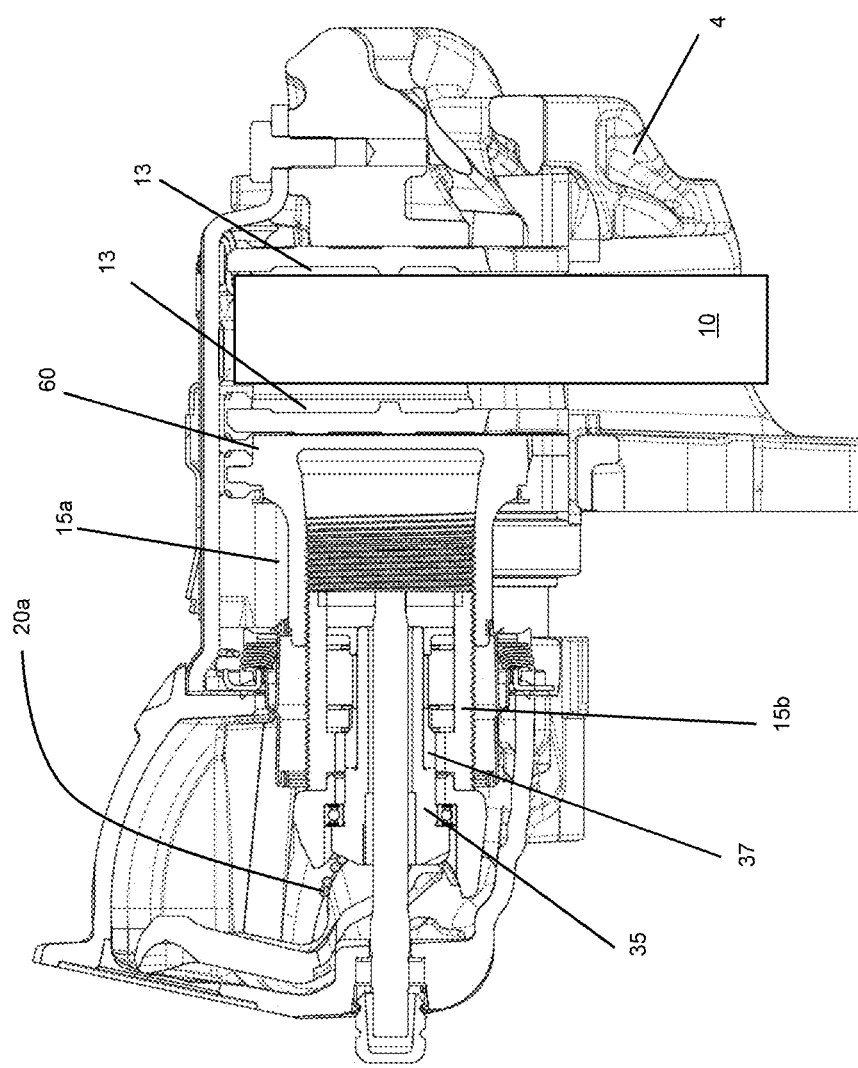
FIG. 3 is a similar cross-section to FIG. 2 but with the pads worn and an adjuster mechanism extended.

FIGS. 1, 2 and 3 illustrate a disc brake 2 incorporating an adjuster mechanism 30 of the present teachings. The disc brake incorporates an actuating mechanism comprising a single piston suitable for a commercial vehicle. This type of brake is particularly, but not exclusively, suitable for lighter duty heavy vehicles, for example smaller trucks, or a trailer of a tractor-trailer combination.

Various orientations of the disc brake are described. In particular, the directions inboard and outboard refer to the typical orientation of the disc brake when fitted to a vehicle. In this orientation, the brake pad closest to the center of the vehicle is the pad directly actuated by an actuation mechanism and being the inboard pad, and the outboard pad being one mounted to a bridge portion of the caliper. Thus, inboard can be equated with an actuating side of the disc brake, and outboard with a reaction side. The terms radial, circumferential, tangential and chordal describe orientations with respect to the brake rotor. The terms vertical and horizontal describe orientations with the disc brake mounted uppermost on an axle, whereas it will be appreciated that in use such a disc brake may adopt any axle orientation depending upon packaging requirements of the vehicle.

The disc brake 2 comprises a caliper 3 having a housing 6 to accommodate the actuation mechanism and which is slideably mounted on a carrier 4 for movement in an inboard-outboard direction.

A friction element in the form of an inboard brake pad 11a comprises a layer of friction material 13 and is arranged so that the friction material 13 faces a brake rotor 10 (also known as a brake disc). The inboard pad 11a is mounted to a brake pad support arrangement. In this embodiment, the inboard brake pad support arrangement is a spreader plate 60 at its inboard face, and a brake carrier in circumferential and radially inward directions. The inboard brake pad 11a is moveable in the direction of arrow 14 (see FIG. 2) against the brake rotor 10 (example of rotor shown schematically in FIG. 2).

A further friction element in the form of an outboard pad 11b, also with a layer of friction material 13, is also provided. The outboard pad 11b is mounted to a further brake support arrangement. Suitable means are provided to urge an outboard brake pad 11b against the opposite side of the rotor 10. In this embodiment, such means comprises a bridge 5 arranged so as to straddle the rotor 10 and to transmit the reaction force from an inboard operating shaft 21 located inboard to the outboard pad 11b. In this embodiment, the housing 6 and bridge 5 are manufactured as a single monolithic casting, but in other embodiments, the bridge may be bolted or otherwise secured to the housing. Radial movement outward along axis R is restricted by pad springs 16a and a pad retainer 16b. If the pad retainer is removed, the brake pads 11a, 11b can be removed and fitted in a radial direction within the caliper and rotor in situ.

With reference to the cross-section view of FIG. 2, the inboard actuation mechanism comprises a single brake piston 15, slideable in the direction of arrow 14 (i.e., inboard-outboard) relative to the rotor 10 (FIG. 2). The actuation mechanism is mounted within a housing 6 of the caliper 3.

In order to urge the piston assembly in the direction of arrow 14, the operating shaft 21 is pivoted about rollers 23 which are located along a transverse axis 28. In this embodiment, there are two rollers 23, which are spaced from one another laterally. Each roller 23 is located on a single bearing surface 27, each surface 27 being curved to accept the roller 23. Curved surfaces 21a of the operating shaft 21 are located opposite the roller 23. The operating shaft has an axis 22, being the radial center of the arc defined by surfaces 21a, which is parallel and offset from the axis 28. The curved surface 21a locates in a semi-circular recess of a yoke 20. A surface 19 of the yoke 20 opposite the recess is in contact with an inboard end face of the piston 15. The operating shaft 21 further comprises a lever 24 having a pocket 25 configured to receive an output push rod (not shown) of a brake actuator (e.g., an air chamber). The lever 24 is, in this embodiment, shaped as an inverted "U" and the line of action of the brake actuator (from pocket 25) is substantially over the line of action of the piston 15.

Located between the curved surface 21a and the recess of the yoke 20, on either arm of the 'U' are needle roller bearings 20a, to enable the operating shaft 21 to pivot around the roller 23, in the recess of the yoke 20.

In other embodiments, another form of cam surface instead of the curved surface 21a of the operating shaft 21 may be employed (e.g., a plain bearing) and/or the arrangement may be reversed with the rollers 23 being in contact with the yoke 20, and the curved surface 21a being located in the recess of the caliper housing 6.

The yoke 20 further includes a sleeve portion 40, which projects axially outboard from the yoke 20. The yoke 20 has a through bore extending axially through its center, the bore also extending through the center of the sleeve portion 40. The diameter of the bore at the sleeve portion 40 is lower than the diameter of bore for the remainder of the yoke, such that an internal shoulder 40a is defined between the sleeve portion 40 and the remainder of the yoke 20. The shoulder 40a defines an annular surface that faces in an inboard direction.

In this embodiment, the sleeve portion 40 and yoke 20 are integral but in other embodiments may be separate components that are fixed together during assembly, in any suitable way.

Application of a force in the direction of arrow 26 (FIG. 2) causes pivoting movement of the operating shaft 21 about the rollers 23 and the curved surface 21a bears on the yoke 20. The offset axes 28 and 22 cause the yoke 20 to move in the direction of the piston 15, contacting the piston 15 and causing the piston 15 to urge the friction material 13 of the brake pad 11a directly against the rotor 10. A reaction force from the operating shaft 21 is transmitted to the bearing surface 27 of the caliper 3 via the rollers 23 and is then transmitted to the outboard pad 11b via the bridge 5, with the friction material 13 of the outboard pad 11b being urged against the rotor 10, such that the pads 11a and 11b clamp the rotor and effect braking through a frictional brake force. In this embodiment, it should be noted that the piston is not itself directly guided with the caliper. Rather, at the outboard end the position of the piston transverse its line of action is determined by interaction of a spreader plate with the brake carrier. In alternative embodiments, the piston may instead be guided.

A wear adjuster mechanism 30 to maintain a desired running clearance between the rotor 10 and inboard and outboard brake pads 11a, 11b is described below. Generally, the operating shaft 21 is connected to a one-way clutch to transfer any rotation of the operating shaft beyond a predetermined degree. Between the one-way clutch and operating shaft is a link member, which is driven by the operating shaft and drives the one-way clutch. The one-way clutch has a driving portion configured to rotate if the link member rotates, and a driven portion mounted on the driving portion, that is driven by the driving portion. In this embodiment, the driving portion is a drive drum 35 with the driven portion being a driven drum 37. With particular reference to FIGS. 2 and 3, in this embodiment, the link member is a pin (not visible) that projects axially outboard from the operating shaft 21 from a position offset from the axis of the drive drum 35. The pin is in communication with a corresponding slot (not visible) in the drive drum, such that as the operating shaft 21 pivots in use, the pin engages within the slot to cause the drive drum 35 to rotate, as discussed in more detail below.

The drive drum 35 is made up of a collar portion 35a at its inboard end and an axially extending projecting 'finger' portion 35b, of a smaller diameter than the collar portion 35a, that extends outboard from the collar portion 35a, concentric with the piston 15. In this embodiment, located adjacent and outboard of the collar portion 35a of the drive drum 35, and concentrically radially outward from the finger portion 35b of the drive drum 35, is the driven drum 37. The driven drum 37 acts as the driven portion of the one-way clutch and is mounted on the drive drum 35. The driven drum 37 comprises a plurality of axially extending recesses 38 which are arranged to accommodate corresponding lugs projecting radially inwardly from input plates of a friction clutch 41. In other embodiments, alternative arrangements for driving the clutch input plates are contemplated e.g., a different number of recesses, or projections rather than recesses. A wrap spring 39 is frictionally wrapped around outer circumferential surfaces of the collar portion 35a of the drive drum 35 and the driven drum 37, such that it bridges the two components and enables the two components to act as a one-way clutch. The wrap spring 39 can easily bridge the two components, as they are both cylindrical and have the same outer diameter at the location point where the wrap spring 39 engages. In other embodiments, other suitable one-way clutches may be utilized, such as ball and ramp, or roller clutch/sprag clutch arrangements.

The friction clutch 41 comprises output plates positioned between the input plates. The output plates of the friction clutch 41 have diametrically opposite radially outwardly facing lugs 43, which are not present on the input plates. Alternatively, a ball and ramp arrangement could be used instead of a friction clutch with input and output plates, as is known in the art.

As can be seen most clearly from FIG. 2, the drive drum 35 is restrained from moving in an outboard direction, and allowed to rotate relative to the yoke 20, by a first bearing 18a. The bearing 18a is an interference fit with the through bore of the yoke 20. An inboard facing surface of the bearing 18a engages an outboard facing surface of a flange portion 35c at the inboard end of the drive drum 35. An outboard facing surface of the bearing 18a engages the annular inboard facing surface of the shoulder 40a of the sleeve portion 40 of the yoke 20. In this way, the drive drum 35 is restrained from moving axially outboard, once the brake is assembled. In this embodiment, the bearing 18a is a deep-groove ball bearing, to help ensure that it can take the axial loads that will be applied during operation of the brake. The bearing 18a also engages a radially outer surface of the collar portion 35a of the drive drum 35, to restrain the drive drum 35 from moving radially, and to take radial loads that pass through the drive drum 35. There is a clearance between the bearing 18a and the wrap spring 39. As well as helping enable smooth rotation of the drive drum 35 relative to the yoke 20, the bearing 18a also helps to locate the drive drum 35 radially, helping to prevent misalignment of the drive drum 35 within the adjuster mechanism, which can impair adjuster function.

The piston 15 comprises an outer piston 15a being a hollow cylinder having an internal female thread 15a', and an inner portion or inner piston 15b, also being a hollow cylinder and having a complimentary external male thread 15b'. Therefore, in this embodiment the inner piston 15b is located within the outer piston 15a. The inner piston 15b has at least one recess in its inner surface. In this embodiment, the recesses are two longitudinally extending channels 42 located diametrically opposite one another. When the adjuster mechanism 30 is assembled, the lugs of the output plates of the friction clutch 41 locate within the channels 42, to key the output plates to the inner piston 15b. Therefore, rotation of the output plates results in rotation of the inner piston 15b.

Figure 6:
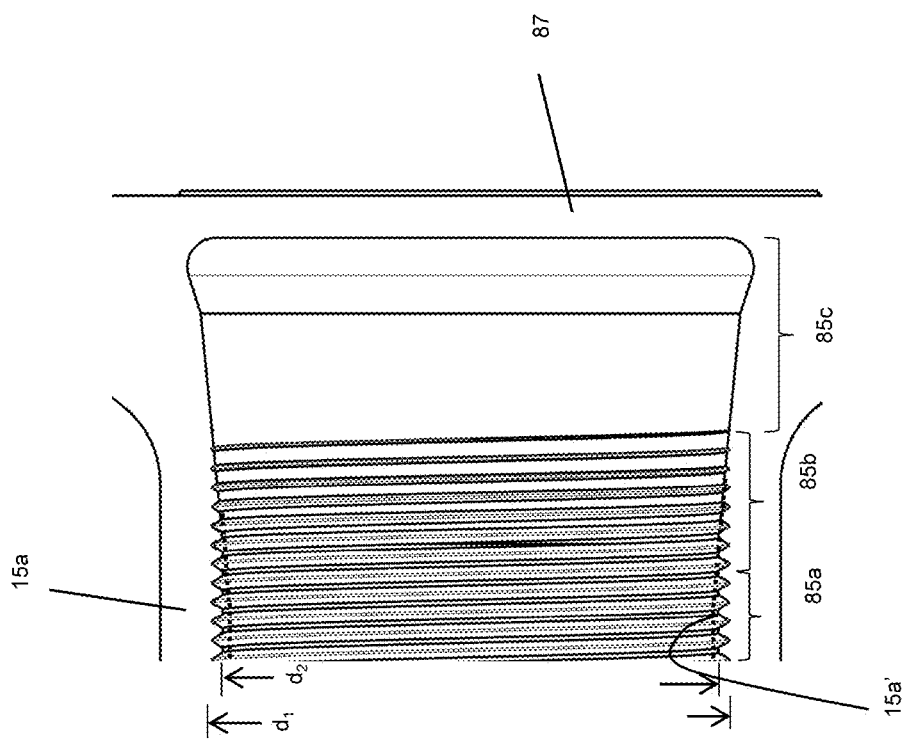
FIG. 6 is an enlarged view of part of the outer piston only of FIG. 5.

With reference to FIG. 6, the female thread 15a' of the outer piston 15a has a minor diameter $d_2$ (the diameter between the peaks of the thread), a major diameter $d_1$ (the diameter between the troughs of the thread) and defines a threaded region 85a.

The outer piston 15a further comprises a non-threaded region 85c of greater diameter than the minor diameter, and a transition region 85b between the female thread and the non-threaded region. The threaded region is provided at an inboard end of the outer piston 15a and the non-threaded region at an outboard end of the outer piston 15a.

In the transition region 85b the minor diameter $d_2$ of the thread progressively increases until it meets the major diameter $d_1$. The major diameter remains constant in the transition region 85b, as does the pitch of the threads.

In this embodiment, the minor diameter $d_2$ increases in a linear manner in the transition region, i.e., when viewed in cross-section, there is a straight-line increase in diameter. In other embodiments, this may not be the case.

In this embodiment, the non-threaded region 85c progressively increases in diameter away from the transition region 85b, with the increase in the diameter of the non-threaded region being a continuation of the progressive increase of the minor diameter. Consequently, the non-threaded region comprises, at least in part, a frusto-conical profile.

The outer piston further comprises an end wall 87 at an end remote from the threaded portion. The end wall is integral and monolithic with the non-threaded portion, as a consequence of being formed as a single cast item. As depicted in FIG. 5, the non-threaded region may increase in diameter at a greater slope adjacent the end wall, but then have a curved portion as it meets and merges into the end wall.

As discussed further below, a spreader plate 60 is also integrally and monolithically formed at the end remote from the threaded portion. The spreader plate 60 is arranged to have a greater surface area than that defined by an outer perimeter of the non-threaded region 85c. This spreads loads applied by the piston 15 across the inboard brake pad 11a actuated by the piston in use.

The outer piston 15a is made in a casting and machining operation. First the basic shape of the outer piston is cast. The internal shape prior to the threads being cut is shown by the dotted lines in FIG. 6. It will be appreciated that a suitable core is used to form the wider diameter transition region 85b and non-threaded region 85c with the conical shape.

A female thread is then cut in the inboard region to form the threaded region 85a and the transition region 85b, removing a small amount of the excess cast material. Due to the initial cast shape, no additional machining is needed to cause the minor diameter to increase in the threaded region 85b, this being as a result of the "slope" of the transition region 85b as cast. In addition, no machining is required to form the non-threaded region 85c, as this is also as cast.

As can be seen in FIG. 4, the outer piston 15a has a significant space between the end of the transition portion 85b and the end wall 87. This assists the thread cutting process because it enables the thread cutting tool to have a long run-out at a gentle angle. As a result, the tapping process may occur at a greater speed for a given power supplied to the tool.

When the adjuster mechanism 30 is assembled, the sleeve portion 40 of the yoke 20 is located concentrically between the wrap spring 39 and the inner piston 15b. The sleeve portion 40 is restrained from rotating, as it is secured to, or integral with, the yoke 20, which is also configured to be non-rotatable when assembled in the disc brake. However, the inner piston 15b is configured to rotate during an adjustment operation, to cause the piston 15 to advance in the direction of the inboard brake pad 11a.

The wear adjuster mechanism 30 additionally comprises first, second and third washers 45a, 45b, 45c. The first washer 45a is located adjacent and inboard of the friction clutch 41, and engages the friction clutch, as well as an outboard facing surface of a stop 44. The second washer 45b is located adjacent and outboard of the friction clutch 41, and an inboard surface of the washer 45b engages the friction clutch. An outboard face of the second washer 45b is acted on by a compression spring 47, the compression spring 47 being arranged concentrically within the inner piston 15b, between the second washer 45b and the third washer 45c. The compression spring 47 loads the friction clutch 41, to generate the required amount of friction to control the torque at which the friction clutch 41 slips. The compression spring 47 also controls the amount of friction between the outboard facing surface of the yoke and the inboard facing end surface of the inner piston 15b.

The compression spring 47 is pre-stressed by an end cap 49. In this embodiment, the end cap 49 is generally hat-shaped in cross-section, with a central bore so the end cap 49 can be mounted on the projecting portion 35b of the drive drum 35. The end cap 49 has a sleeve portion projecting in an axially inboard direction. A second bearing 18b is provided between a radially outer surface of the sleeve portion of the end cap 49 and a radially inner surface of the inner piston 15b. In this embodiment, the second bearing 18b is a standard thrust bearing. The end cap 49 engages the third washer 45c to pre-stress the compression spring 47.

Between an inboard facing surface of the sleeve portion of the end cap 49 and an outboard facing surface of the driven drum 37 is an annular spacer element 51. The spacer element 51 is located on the projecting portion 35b of the drive drum 35. In this embodiment, the spacer element 51 has some play in the axial direction. In other words, an air gap is defined between the spacer element 51 and the drive drum 35 and/or the spacer element 51 and the sleeve portion of the end cap 49.

In this embodiment, the outer piston 15a is integral (i.e., formed monolithically from the same material by casting, or forging, for example) with the spreader plate 60. The spreader plate 60 acts on the inboard brake pad 11a, as well as engages surfaces of the carrier 4. Therefore, the interaction of the spreader plate 60 and carrier 4 prevent rotation of the outer piston 15a in use.

In order to maintain a desired running clearance between the brake pads and rotor, the wear adjuster mechanism 30 is required to periodically advance the inboard brake pad 11a towards the rotor 10 to account for the loss of friction material 13, and to a lesser extent loss of material from the face of the rotor 10, due to wear.

A predetermined amount of play or backlash is provided in the system between the pin and slot of the operating shaft and driving portion of the adjuster mechanism, (or between the lugs of the input plates of the friction clutch 41 and the recesses 38, in other arrangements not shown in the figures). In a normal braking operation in which the running clearance is within the desired parameters, as the operating shaft 21 pivots, the play in the system means that no adjustment will occur.

If the running clearance is however greater than the desired range, the aforesaid play is taken up. Whilst there is excess running clearance to be taken up, this rotation is transmitted via the drive drum 35 to the wrap spring 39, causing the wrap spring 39 to rotate around the drive drum 35 and driven drum 37 in a direction which causes the wrap spring 39 to tighten, transmitting the rotation from the drive drum 35 to the driven drum 37. More specifically, this rotation is transmitted as the wrap spring bridges the two components, i.e., a first end of the wrap spring 39 engages an outer surface of the drive drum 35 and a second end of the wrap spring 39 engages an outer surface of the driven drum 37. Rotation of the driven drum 37 causes rotation of the input plates of the friction clutch 41, due to the interaction of the recesses 38 and the lugs of the input plates. Rotation of the input plates results in rotation of the output plates, due to the friction between the input and output plates. As the lugs 43 of the output plates engage the channels 42 of the inner piston 15b, the inner piston 15b is also caused to rotate.

Since the outer piston 15a is restrained from rotation by the engagement of the spreader plate 60 and the carrier 4, this causes a lengthening of the piston 15 to reduce the running clearance. At the point at which the friction material 13 comes into full contact with the rotor 10, the torque passing through the adjuster mechanism will start to increase. When this torque increases to a level that is higher than the maximum torque value of the friction clutch 41, the friction clutch 41 slips and further extension of the outer piston 15a is prevented. Once the braking operation ceases, return springs (not visible) act to urge the operating shaft 21 back to its rest position. A corresponding retraction of the inner piston 15b is prevented since the wrap spring 39 relaxes and does not transmit a reverse rotation to the driven drum 37.

Preferably, the engagement between the inboard-facing surface of the inner piston 15b and the outboard-facing surface of the yoke is configured to resist relative rotation of the yoke 20 and inner piston 15b with a torque greater than the torque required to cause the one-way clutch (in this case the wrap spring 39) to slip, when the actuation force is released at the end of a braking operation. This helps to ensure that the wrap spring 39 slips rather than permitting unwanted de-adjustment of the brake occurring during brake release.

The co-axial mounting of the adjuster mechanism 30 within the piston 15 minimizes the space required by the mechanism within the housing, resulting in a lighter, more compact housing.

It will be appreciated that numerous changes may be made within the scope of the present teachings. For example, certain aspects of the invention may be applicable to other types of brake, such as twin piston or electromechanically actuated brakes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adjuster mechanism for a disc brake, the adjuster mechanism comprising:
   an outer piston defining a bore having a female thread, the female thread having a minor diameter and a major diameter; and
   an inner piston having a complementary male thread thereon;
   wherein the outer piston further comprises a non-threaded region that has a larger diameter than the minor diameter and a transition region between the female thread and the non-threaded region; and
   wherein in the transition region the minor diameter of the female thread progressively increases until it meets the major diameter.

2. The adjuster mechanism of claim 1 wherein the minor diameter increases in a linear manner in the transition region.

3. The adjuster mechanism of claim 1 wherein the non-threaded region progressively increases in diameter away from the transition region.

4. The adjuster mechanism of claim 3 wherein the progressive increase in the diameter of the non-threaded region is a continuation of the progressive increase of the minor diameter.

5. The adjuster mechanism of claim 4 wherein the non-threaded region comprises, at least in part, a frusto-conical profile.

6. The adjuster mechanism of claim 1 wherein the outer piston further comprises an end wall at an end remote from the female thread.

7. The adjuster mechanism of claim 6 wherein the end wall is integral and monolithic with the non-threaded region.

8. The adjuster mechanism of claim 1 further comprising a torque limiting clutch and a one-way clutch arranged to take an input from an operating shaft and selectively transmit the input to the inner piston to cause rotation of the inner piston and extension of the outer piston.

9. The adjuster mechanism of claim 1 wherein the transition region extends axially over at least two adjacent threads.

10. The adjuster mechanism of claim 1 wherein the increase in the minor diameter results from a crest of each thread being progressively flattened.

11. An adjuster mechanism for a disc brake, the adjuster mechanism comprising;
    an outer piston defining a bore having a female thread, the female thread having a minor diameter and a major diameter; and
    an inner piston having a complementary male thread thereon;
    wherein the outer piston further comprises an end wall at an end remote from the female thread, a non-threaded region that has a larger diameter than the minor diameter, and a transition region between the female thread and the non-threaded region, wherein in the transition region the minor diameter of the female thread progressively increases until it meets the major diameter, and wherein a plate is integrally and monolithically formed at the end remote from the female thread, the plate being arranged to have a greater surface area than that defined by an outer perimeter of the non-threaded region to spread a load applied by the outer piston across a friction element actuated by the outer piston in use.

12. The adjuster mechanism of claim 1 wherein the outer piston is a cast component.

13. The adjuster mechanism of claim 12 wherein the non-threaded region has a bare cast surface.

14. A method of manufacturing an adjuster mechanism for an air disc brake, the method comprising the steps of:
    casting an outer piston having a bore, the bore having a first region having a first diameter, a transition region adjacent the first region and having a progressively increasing diameter, and a third region having a diameter at least as large as a largest diameter of the transition region; and cutting a female thread in the outer piston having a minor diameter greater than the first diameter of the first region and a major diameter less than a smallest diameter of the third region such that the first region defines a threaded region, the third region defines a non-threaded region, and in the transition region the minor diameter of the female thread increases until it meets the major diameter.

15. The method of claim 14 wherein the minor diameter increases in a linear manner in the transition region.

16. The method of claim 14 wherein the non-threaded region progressively increases in diameter away from the transition region.

* * * * *